United States Patent

Harting et al.

[11] Patent Number: 5,885,102
[45] Date of Patent: Mar. 23, 1999

[54] ELECTRICAL PLUG CONNECTION

[75] Inventors: Dietmar Harting, Espelkamp; Herbert Junck, Lubbecke; Heiko Herbrechtsmeier, Bunde; Harald Moller; Martin Schmidt, both of Lubbecke, all of Germany

[73] Assignee: Harting KGaA, Germany

[21] Appl. No.: 901,150

[22] Filed: Jul. 28, 1997

[30] Foreign Application Priority Data

Aug. 30, 1996 [DE] Germany ............... 296 15 095 U

[51] Int. Cl.⁶ .................................................. H01R 13/60
[52] U.S. Cl. .......................................................... 439/527
[58] Field of Search .................................. 439/568, 527, 439/685, 717, 404; 310/71, 68

[56] References Cited

U.S. PATENT DOCUMENTS

| | | |
|---|---|---|
| 3,602,748 | 8/1971 | Locke . |
| 3,850,496 | 11/1974 | Hague ........................................ 439/685 |
| 4,336,975 | 6/1982 | Casteel ...................................... 439/527 |
| 4,649,304 | 3/1987 | Atherton et al. ......................... 439/404 |
| 4,851,725 | 7/1989 | Keck . |
| 5,015,894 | 5/1991 | Crow et al. ............................... 439/568 |
| 5,342,215 | 8/1994 | Silbernagel et al. ..................... 439/527 |
| 5,408,154 | 4/1995 | Meiser et al. . |

FOREIGN PATENT DOCUMENTS

| | | |
|---|---|---|
| 0 428 749 A | 5/1991 | European Pat. Off. . |
| 89 14 027 U | 2/1990 | Germany . |

*Primary Examiner*—Hien Vu
*Attorney, Agent, or Firm*—Dorn, McEachran, Jambor & Keating

[57] ABSTRACT

For an electrical plug connection for connecting electrical leads to a motor, the said connection consisting of a first plug connection half, which is disposed in a flange-type or attachment-type housing attached to the motor, and a second plug connection half which can be plugged together with the first plug connection half, it is proposed that the first plug connection half be provided with a contact pin carrier, the contact pins of which are connected to the connecting leads of the motor, and that the second plug connection half be equipped with a socket carrier, to the contact sockets of which the leads of a connecting cable can be connected.

2 Claims, 2 Drawing Sheets

ELECTRICAL PLUG CONNECTION

THE FIELD OF THE INVENTION

The invention relates to an electrical plug connection for connecting electrical leads to a motor, the said connection consisting of a first plug connection half, which is disposed in a flange-type or attachment-type housing attached to the motor, and a second plug connection half which can be plugged together with the first plug connection half.

Plug connections of this type are used for connecting the supply voltage to motors.

It is known practice to provide motors with a terminal box in which the connecting lines of the motor windings end at terminals, and wherein an external connecting cable is routed into the terminal box. The motor circuit, such as, for example, a star or delta circuit, is selected by connecting the cables to the terminals in the terminal box in a suitable manner. Under these circumstances, bridges are provided, if need be, between individual terminals in order to obtain the motor circuit which is desired in each case. In the event of a motor failing, that is to say if the said motor has to be replaced, it is necessary to first of all produce the appropriate motor circuit in the terminal box of the motor by means of suitable bridges, and then to connect the connecting cable to specific terminals. In the process, incorrect wiring-up may possibly occur and even, under certain circumstances, destruction of the motor. In addition to the above, it is also known practice to provide, on the terminal box, a plug connection for connecting the supply voltage of the motor. But here too, the motor circuit which is needed in each case has to be produced in the terminal box in the event of a motor being replaced.

SUMMARY OF THE INVENTION

The underlying object of the invention is to develop a plug connection of the initially mentioned type to the effect that the connection of a motor to its supply voltage, and its replacement if necessary, is simplified and incorrect wiring-up operations are precluded.

This object is achieved through the fact that the first plug connection half has a contact pin carrier, the contact pins of which are connected to the connecting leads of the motor, and that the second plug connection half has a socket carrier, to the contact sockets of which the leads of a connecting cable can be connected.

Advantageous refinements of the invention are indicated in claims 2 to 4.

The advantages obtained with the invention consist, in particular, in the fact that the motor circuit which is required in each case is already provided in the plug of the connecting cable, so that no connecting/wiring-up operations of any kind are required when a motor is connected or replaced. All that is needed is to plug the plug connection half on the connecting cable onto the plug connection half on the motor.

BRIEF DESCRIPTION OF THE DRAWINGS

An exemplified embodiment of the invention is represented in the drawings and will be explained in greater detail below. In the drawings.

DESCRIPTION OF THE PREFERRED EMBODIMENT

Figure 2:
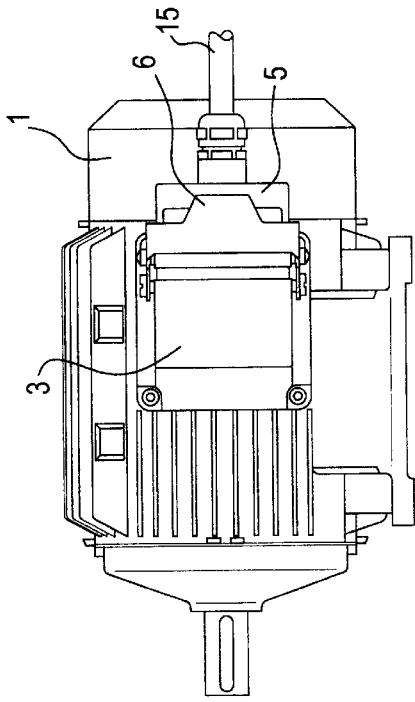
FIGS. 1–3 show views of a motor with a plug connection.
Figure 3:
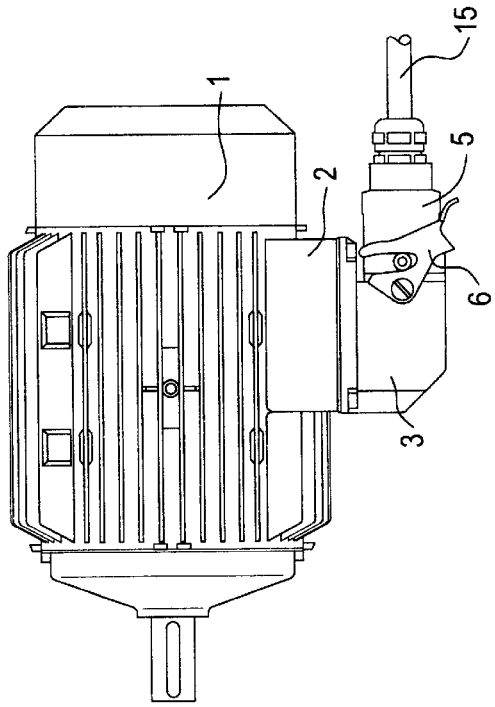
Figure 1:
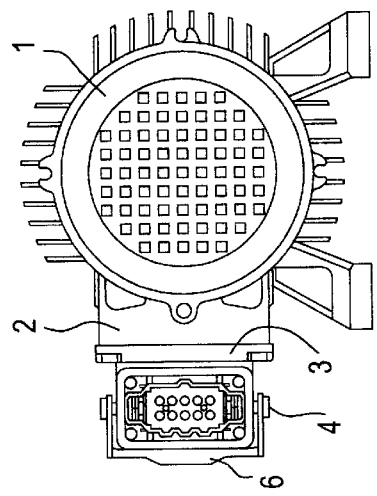

The motor 1 represented in FIGS. 1–3 is provided with an attachment flange 2 on which a first plug connection half 4, which is fastened in a flange-type housing 3, is disposed. A second plug connection half 5 can thus be plugged in and locked by means of a locking clip 6.

Figure 4:
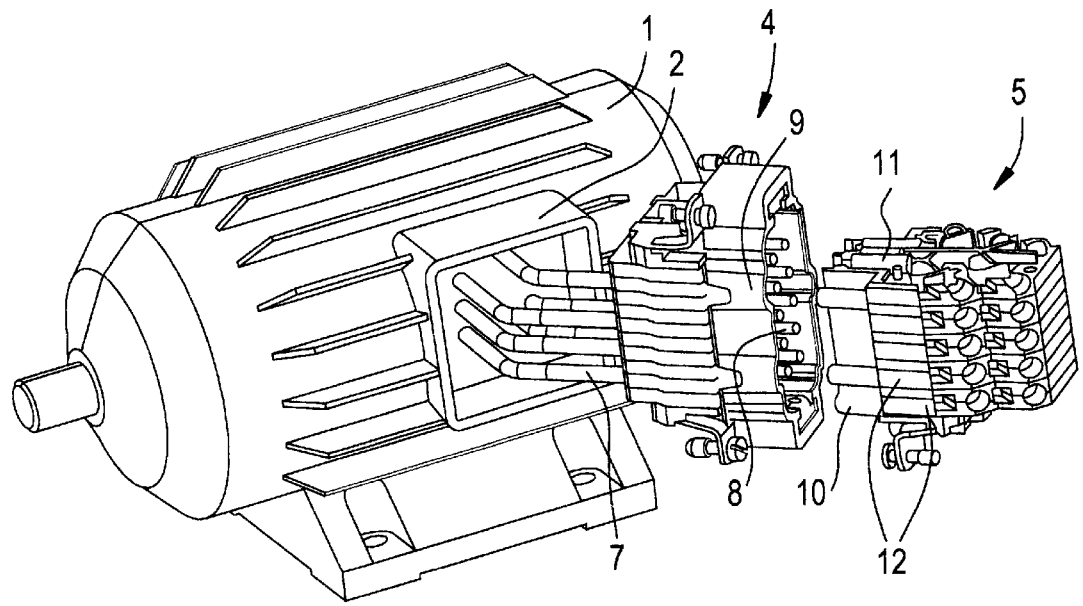
FIG. 4 shows an exploded view of the plug connection of the motor.

FIG. 4 shows the essential structural elements of the plug connection in an exploded view wherein, for the sake of clarity, the housings of the plug connection halves are not represented. The connecting leads 7 of the motor windings are, in each case, connected to a contact element 8 in the first plug connection half 4, the said contact elements being held in a contact pin carrier 9. The contact elements of this plug connection half are constructed as pin-type contacts and each lead from the motor is associated with a separate contact element.

Figure 5:
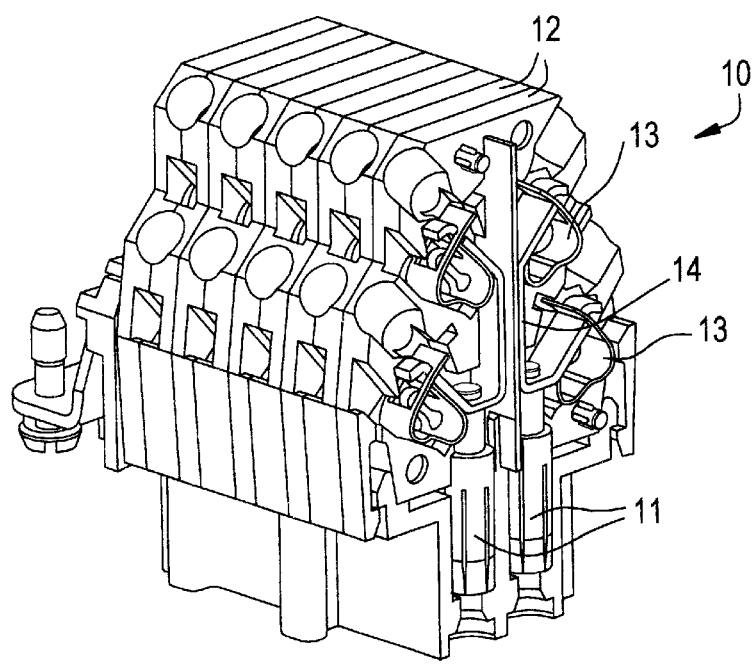
FIG. 5 shows an enlarged view of the second plug connection half.

The second plug connection half 5 has a socket carrier 10 in which the contact elements 11, which are constructed as socket-type contacts, are held in segments 12. FIG. 5 shows an enlarged view of the socket carrier. Two contact elements, which are insulated from one another, are provided in each segment. Each contact element 11 is further connected to two conductor-connecting devices 13, this connection preferably taking place by means of a current rail 14. The conductor-connecting devices are preferably constructed as cage-type tension springs in order to permit simple connection of the leads of the connecting cable (15).

In that embodiment of the plug connection which is described above, it is now possible to provide for the special wiring-up/method of connection of the motor by means of special bridgings and the connection of the connecting cable in the second plug connection half which can be plugged together with the motor, without it being necessary to change the pin configuration of the first plug connection half on the motor.

We claim:

1. An electrical plug connection for connecting electrical leads to a motor, said connection consisting of a first plug connection half, which is disposed in a flange-type or attachment-type housing of said motor, and a second plug connection half which can be plugged into the first plug connection half, said first plug connection half (4) having a contact pin carrier (9) and contact pins (8) positioned in said pin carrier, said contact pins being connected to connecting leads (7) of the motor (1), said second plug connection half (5) having a socket carrier (10) and contact sockets (11) positioned in said socket carrier, said contact sockets being connected to leads of a connecting cable (15), wherein contact sockets (11) are provided with double connector connecting springs (13) for receiving a separate wire therein, said connecting springs (13) are connected by current rails (14) fixed to ends of the contact sockets (11).

2. Electrical plug connection according to claim 1, characterized in that each of the connecting springs (13) are screwless terminals.

* * * * *